Nov. 10, 1959     D. E. BECKETT     2,911,753
NIGHT CRAWLER HARNESS
Filed May 24, 1954     2 Sheets-Sheet 1
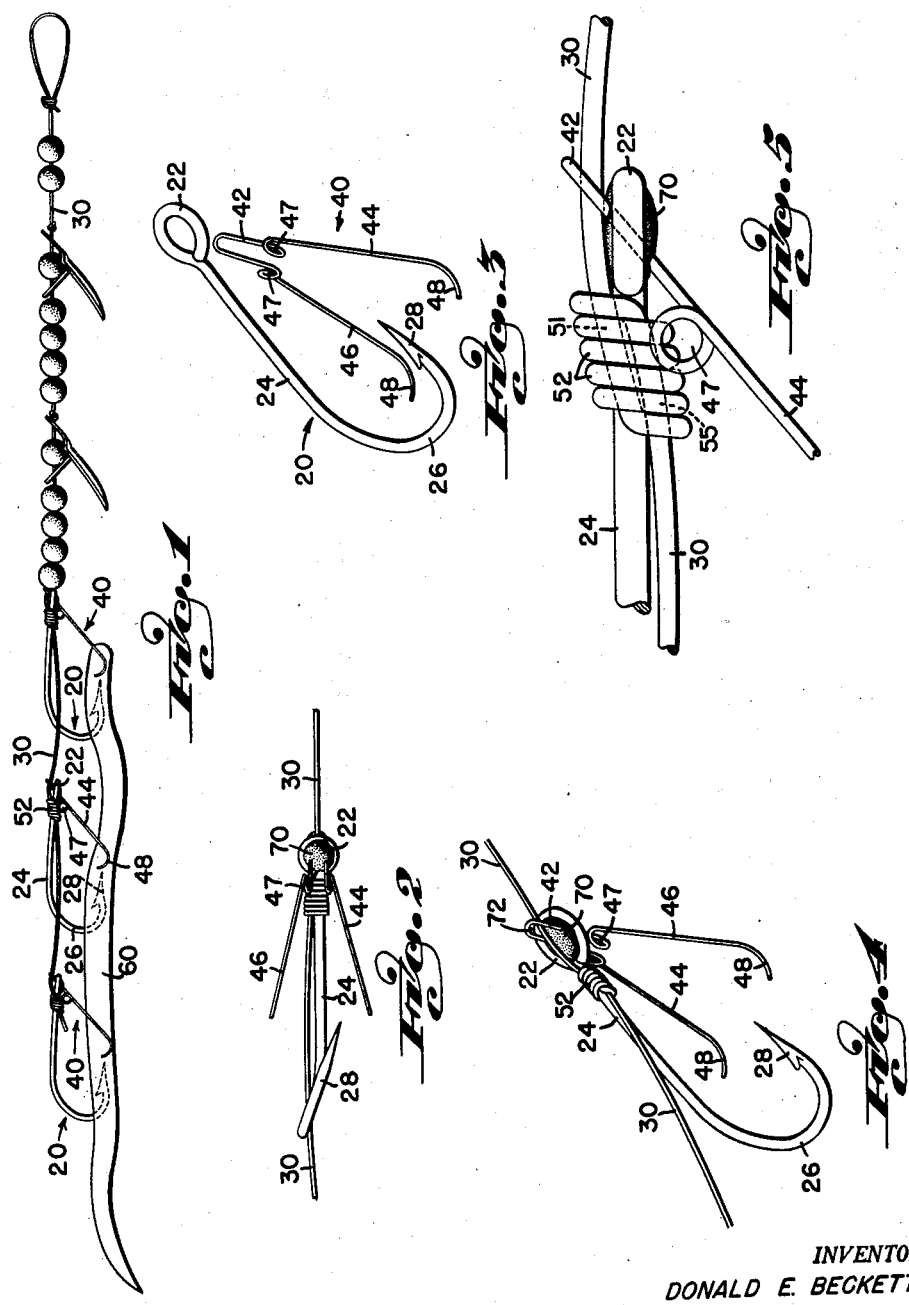
INVENTOR.
DONALD E. BECKETT
BY
J. Warren Kinney, Jr.
ATTORNEY Nov. 10, 1959  D. E. BECKETT  2,911,753
NIGHT CRAWLER HARNESS
Filed May 24, 1954  2 Sheets-Sheet 2
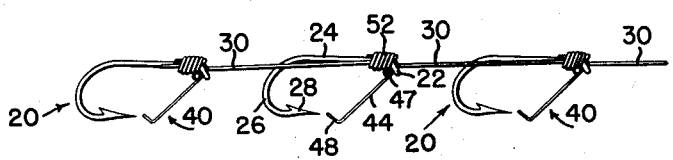
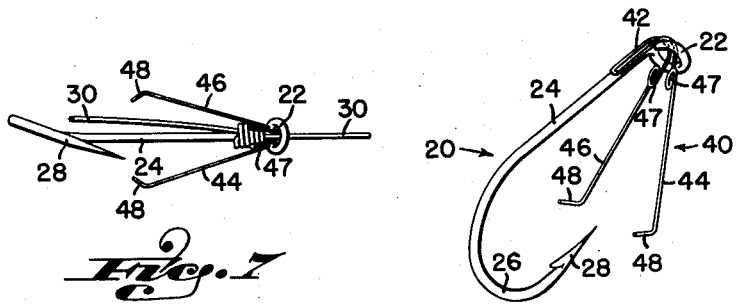
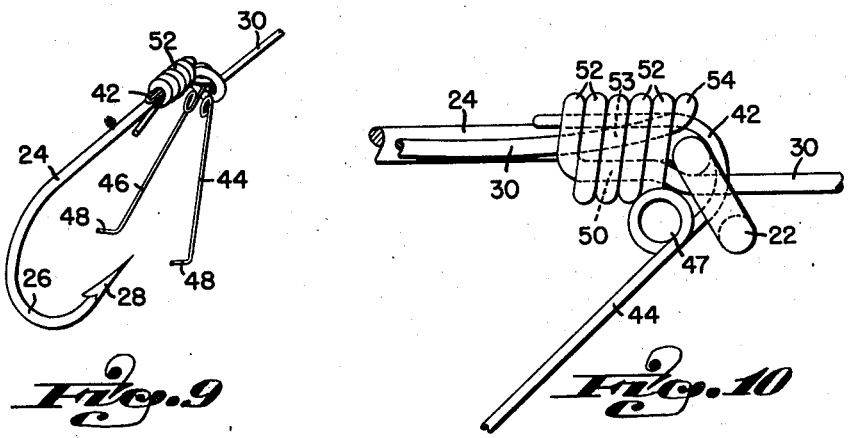
INVENTOR.
DONALD E. BECKETT
BY
J. Warren Kinney, Jr.
ATTORNEY

2,911,753
NIGHT CRAWLER HARNESS
Donald E. Beckett, Wilmington, Ohio

Application May 24, 1954, Serial No. 432,006

1 Claim. (Cl. 43—43.2)

This invention relates to a night crawler harness.

An object of the invention is to provide a night crawler harness which comprises a plurality of hooks secured in spaced axial alignment from a continuous leader in such a manner as to enable the hooks to be imbedded in a night crawler for suspending it in "elongated condition" from and in parallelism with the leader.

Another object of the invention is to provide a night crawler harness the individual hooks of which are provided with weed guards, and wherein the shanks of the individual hooks are secured to a common leader for disposing the shanks in substantial parallelism with the axis of the leader, when extended.

A further object of the invention is to provide a night crawler harness in which the weed guard associated with each hook is secured to the hook by means of the continuous leader by which the hooks are interconnected.

Still another object of the invention is to teach a method of fabricating a night crawler harness having the hereinabove described characteristics.

A further object of the invention is to provide a night crawler harness having the hereinabove described characteristics, which is adapted to materially enhance the effectiveness of bait suspended therefrom.

These and other objects are attained by the means described herein and as disclosed in the accompanying drawings in which:

Fig. 1 is a side elevational view of a night crawler harness embodying the teachings of the present invention, showing a night crawler operatively associated therewith.

Fig. 2 is a bottom view of one of the hook assemblies comprising a detail of the present invention.

Fig. 3 is a perspective view of a fishhook and weed guard prior to being assembled.

Fig. 4 is a perspective view illustrating one method of securing the weed guard to the hook and for securing the shank of a fishhook to the leader.

Fig. 5 is an enlarged view of the upper portion of the assembly of Fig. 4.

Fig. 6 is a side view of a modified form of night crawler harness embodying the teachings of the present invention.

Fig. 7 is a bottom view of one of the hook assemblies of Fig. 6.

Figs. 8 and 9 are perspective views illustrating sequential steps in the process of securing a weed guard to the shank of a fishhook by means of the same leader by which the individual hooks are interconnected.

Fig. 10 is an enlarged view of the upper end of Fig. 9 for more clearly illustrating the structural details thereof.

With references now to the drawings, the numeral 20 denotes generally a fishhook which comprises an eyelet 22, a shank 24 and a hook 26 which terminates in a barb 28. The hook portion 26 is turned whereby to dispose the barb in substantial spaced parallelism with the shank.

It should be noted that the aforesaid fishhook comprises a standard item of commerce.

The numeral 40 denotes generally a weed guard fabricated from spring wire and which includes a central U-portion 42 the depending sides of which are formed to provide divergent legs 44 and 46 the free ends of which are turned inwardly as at 48.

With particular reference now to Figs. 6 through 10, it will be noted that I secure the weed guards to their respective fishhooks by the same continuous leader 30 which interconnects the individual fishhooks with their shank portions 24 in substantial parallelism with the axis of the leader, when extended.

With reference to Fig. 8, it will be noted that the first step in fabricating a harness is to introduce the central U-portion 42 of a weed guard upwardly through eyelet 22, and of then bending the closed end of the central portion forwardly and downwardly onto, in contact with, and overlying shank 24 adjacent eyelet 22. Each of legs 44 and 46 may be provided with a loop 47 for enhancing the resiliency of the legs starting at a point immediately below eyelet 22.

The next step consists of introducing the free end of leader 30 through eyelet 22 and between the depending sides of central portion 42, thence forwardly under shank 24 as at 50, thence upwardly and around the shank and central portion 42 as at 52, thence adjacent the eyelet, as at 54, forwardly under loops 52 as at 53, and in parallelism with shank 24, for thereby securely and fixedly anchoring the weed guard to the fishhook while at the same time securing the shank of the fishhook to and in substantial parallelism with the axis of the leader.

It will be understood that the above step will be repeated whereby a plurality of fishhooks and their respective weed guards, three in Fig. 6, will be secured to the leader for disposing barbs 28 of the individual fishhooks spaced from and in substantial parallelism with the leader.

As best illustrated in Fig. 1, the hook and barb portions of the fishhooks are adapted to be imbedded at spaced intervals within the body of a night crawler denoted generally by the numeral 60 whereby it will be supported or suspended in a fully extended position in substantial parallelism with the leader 30. When thus supported, a night crawler is most advantageously exposed as a live, irresistably tempting bait.

With particular reference to Figs. 1 and 6, it will be noted that the lower ends 48 of the legs of the weed guards are positioned below and straddle-wise of barbs 28 of the hooks, thereby precluding accidental or unintentional snagging of the hooks incident to use of the harness.

With particular reference now to Figs. 2 through 5, it will be noted that the central U-portion 42 of a weed guard, after having been inserted upwardly through an eyelet 22, is permanently secured thereto by means of a drop of solder denoted generally by the numeral 70. The leader 30, instead of being inserted through eyelet 22, as in Fig. 10, is then inserted through loop 72 formed by that part of central portion 42 disposed above solder 70. The leader is led forwardly as indicated by the numeral 51 and then wrapped, as at 52, about shank 24 of the fishhook adjacent the eyelet with the end being led under loops 52 as at 55 for thereby securely anchoring the shank to and in substantial parallelism with the axis of the leader, when extended.

From the foregoing, it will be noted that I have thus provided a night crawler harness which will support a night crawler in extended position, and wherein a continuous leader is utilized to interconnect a plurality of fishhooks in spaced axial relationship, the same leader being utilized, in the modification illustrated in Figs. 6 through 10, to securely anchor the weed guards relative to their individual fishhooks.

What is claimed is:

A fish bait supporting harness for suspension from the end of a fishing line, comprising, in combination, a plurality of fishhooks each having an eyelet, a shank, and a barbed end, the latter being in substantial spaced parallelism with the shank, a plurality of weed guards equal in number to the number of fishhooks, and each comprising a pair of divergent legs and a constricted U-portion connecting the legs, the U-portion of each guard being received in an eyelet of a fishhook and disposed in overlying relationship upon the shank with the U-portion abutting the shank along a side of the shank opposite to the side from which the barbed end extends, and a one-piece connecting means for all the fishhooks and their associated weed guards, consisting of a continuous leader having a looped end, a terminal opposite end, and an intermediate portion, said intermediate leader portion at spaced intervals along its length being passed through each eyelet and wrapped around each shank and its associated weed guard, for lashing the U-portion of a guard to the shank of each fishhook, the portions of the leader between consecutive wraps being aligned with the shanks of the fishhooks and disposed in substantial parallelism with the barbed ends, when suspended for use.

References Cited in the file of this patent

UNITED STATES PATENTS

| | | |
|---|---|---|
| 787,679 | Koch | Apr. 18, 1905 |
| 797,281 | Henzel | Aug. 15, 1905 |
| 889,505 | Bingenheimer | June 2, 1908 |
| 1,435,177 | Peckinpaugh | Nov. 14, 1922 |
| 1,889,707 | Soltis et al. | Nov. 29, 1932 |
| 2,000,954 | Hopkins | May 14, 1935 |
| 2,047,676 | Edmondson | July 14, 1936 |
| 2,102,739 | Peters | Dec. 21, 1937 |
| 2,256,173 | Schechterle | Sept. 16, 1941 |

FOREIGN PATENTS

| | | |
|---|---|---|
| 1,035,843 | France | Apr. 22, 1953 |